United States Patent Office 3,605,460
Patented Sept. 20, 1971

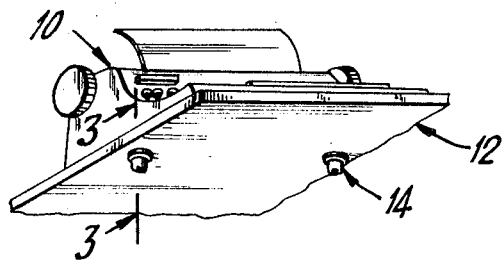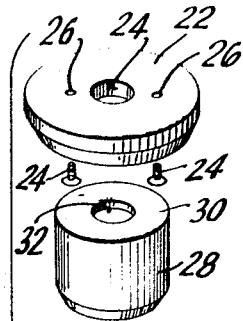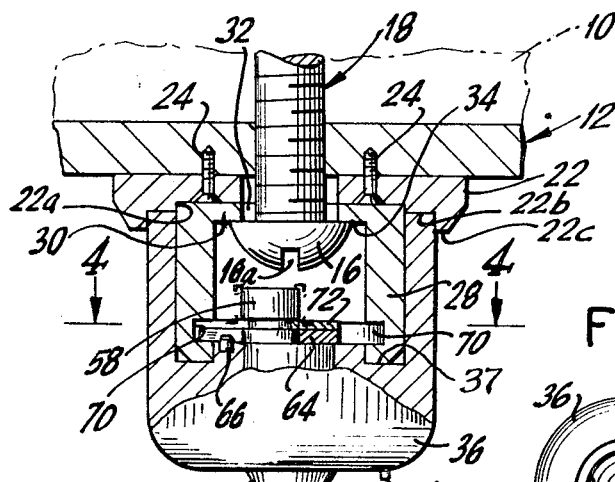

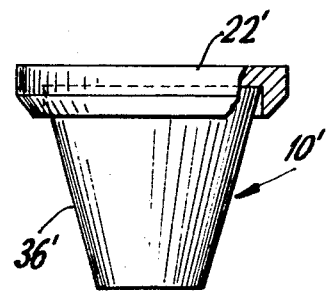
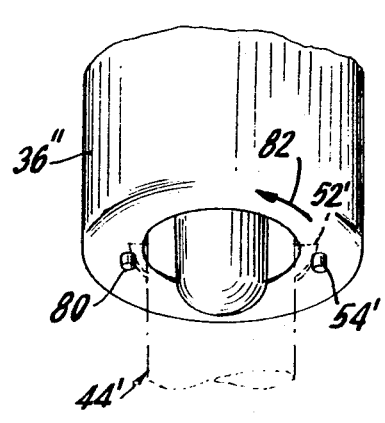
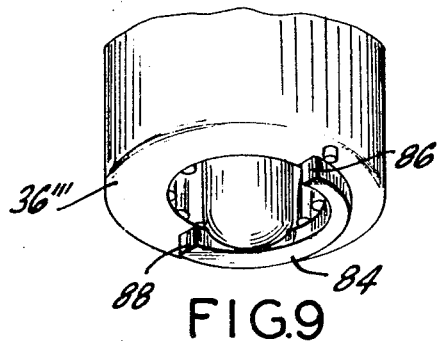
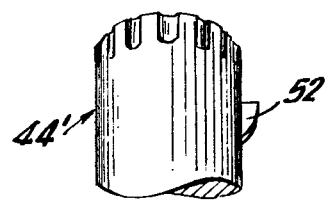
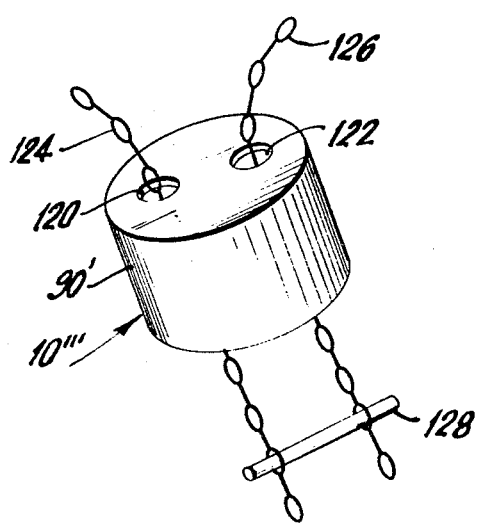
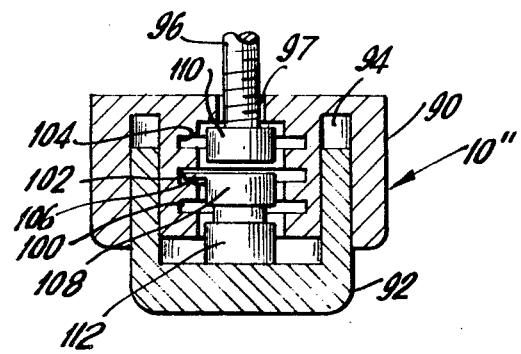

3,605,460
BOLT HEAD LOCK
M. Leonard Singer, 1500 Cardinal Drive, Little Falls, N.J. 07424, and Robert M. Woletz, 294 Buttonwood Drive, Paramus, N.J. 07652
Filed Jan. 27, 1969, Ser. No. 794,047
Int. Cl. F16b 41/00; E05b 73/00
U.S. Cl. 70—232
18 Claims

ABSTRACT OF THE DISCLOSURE

A device for locking typewriters and similar articles which are adapted to be positioned in a fixed location on a mounting platform or desk comprises an inner cylindrical member which includes a bore through its closed end which is adapted to receive a securing bolt which is provided for anchoring the article to the mounting location. The head of the securing bolt is adapted to engage over a ledge formed at the inner end of the inner cylindrical member and the head can be affixed to the cylindrical member such as by welding. The cylindrical member is carried on a flat plate or washer which includes means for fixing it to the mounting base for the article in a manner such that it will not rotate. When the lock is opened the cylindrical member is exposed to permit access to the head of the screw by a screw driver wrench so that it can be unthreaded to release the article. The inner cylindrical member is adapted to interengage with an outer cylindrical member or locking head which has an opened end into which the inner cylindrical member is directed and a closed end carrying a key engagement fitting. The key engagement fitting accommodates a key which may be rotated to shift a bolt member carried by the outer cylindrical member laterally to engage in a slot of the inner cylindrical member and to thus hold the assembly together. The assembly covers the bolt head so that the securing bolt cannot be rotated to effect disengagement from the article held thereby.

SUMMARY OF THE INVENTION

This invention relates, in general, to the construction of locks, and in particular, to a new and useful lock for securing the head of a holding element such as a threaded bolt so that the latter cannot be disengaged for removal of an article held thereby.

The present invention is an improvement over the prior art inasmuch as it provides means for holding an article such as a typewriter, adding machine, and similar devices in a fixed locked position on a desk and provides means for locking a holding element such as a threaded bolt against engagement by a tool for unthreading. In the preferred construction the locking assembly includes a flat washer member which is adapted to be affixed to the underside of the mounting base desk, platform or the like for the article to be secured and to surround an opening in the mounting base for a securing bolt which extends through the base and threadably engages and holds the article in position. The flat washer includes a cylindrical recess which accommodates an inner cylinder which has a through opening for a securing bolt and which is adapted to be positioned within an inner cylindrical recess of the washer member. The inner cylinder advantageously may be permanently affixed to the securing bolt which is adapted to pass through the opening affixed at the inner end thereof so that its head rests on a ledge formed by the closed end and may for example, and is welded in position on the ledge. During assembly the threaded bolt with the inner cylinder engaged therewith is positioned to extend upwardly through the bore of the washer member and the opening provided in the mounting base and it is threaded into the article located above the mounting base. The threading will cause the inner cylinder to abut against the inner surface of the flat washer member and the head of the bolt will be located well within the inner cylinder with access thereto being through the opened end of the inner cylinder. The opened end of the inner cylinder is then closed by a cover member or outer cylinder which fits around the inner cylinder and may be positioned flush against an annular recess of the flat washer member which extends around the inner cylinder.

The outer cylinder carries the locking mechanism which includes a rotatable axle member having a cylindrical extension which is eccentrically carried thereon and which projects into the central interior of the outer cylindrical member from its closed end. A key is receivable into the closed end of the outer cylinder within a key receiving chamber and it may cause rotation of the cylindrical member. The eccentrically positioned cylindrical extension carries a substantially U-shaped sliding bolt and it has a fixed projection on its interior which is located between opposite legs of the bolt and permits transverse movement but prevents rotation thereof. The sliding bolt may be moved from a position at which it extends outwardly at one side and is in engagement with an annular groove defined on the inner cylinder to hold the inner and outer cylinders together to a position at which it is moved concentrically within the outer cylinder and out of the groove so as to release from the inner cylinder to permit the disassociation of these two parts. This movement is accomplished by the eccentrically positioned cylindrical extension around which the sliding bolt is mounted. When a key is rotated the cylindrical extension will cause the lateral displacement of the sliding bolt.

Accordingly, it is an object of the invention to provide a device for locking articles such as typewriters, to a mounting base, or for securing articles in position.

A further object of the invention is to provide a locking mechanism for securing the head of a threadable member such as a bolt which must be turned to affect its removal and which includes a first cylindrical element which is adapted to engage the bolt adjacent the head thereof and another cylindrical element which is adapted to fit over the first and to hold the two elements together so that access to the head is prevented.

Anoher object of the invention is to provide an improved locking structure which includes a first locking member which is telescopic within a second locking member, the second locking member having a key operated rotatable part with an eccentric portion and bolt associated therewith which is moved by said eccentric portion into engagement with a groove of the first part to hold the two parts together.

A further object of the invention is to provide a locking device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a bottom perspective view of a mounting for a typewriter having a securing lock therefore constructed in accordance with the invention;

FIG. 2 is an exploded perspective view of a bolt lock and key therefore constructed in accordance with the invention;

FIG. 3 is an enlarged sectional view taken on line 3—3 of FIG. 1;

FIG. 4 is a section taken on line 4—4 of FIG. 3;

FIG. 5 is a view similar to FIG. 4 indicating the parts in an unlocked position;

FIG. 6 is a bottom plan view on a slightly reduced scale;

FIG. 7 is a side elevational view of another embodiment of securing lock;

FIG. 8 is a partial bottom perspective view of another embodiment of securing lock, indicating key-rotational stops;

FIG. 9 is a view similar to FIG. 8 of another embodiment of the invention;

FIG. 10 is a partial axial sectional view of another embodiment of the invention; and FIG. 11 is a partial bottom perspective view of a combination base plate and inner cylinder of another embodiment of lock.

DETAILED DESCRIPTION OF THE PREFERRED EMBODIMENT

Referring to the drawings in particular, the invention embodied therein comprises a device for locking articles such as typewriters, adding machines and similar devices generally designated 10 onto a mounting base or desk top generally designated 12. The apparatus comprises a locking assembly generally designated 14 which is adapted to engage around and hold the head 16 of a bolt generally designated 18 so that the head is not accessible for rotating the bolt to disengage a threaded portion 20 thereof from a threaded bore which is defined in the article 10.

In accordance with the invention the locking device includes a base plate or washer 22 having an opening 24 therethrough large enough to permit clearance of the threaded portion 20 of the bolt 18. The base plate 22 may be completely disassociated from the platform 12 or, in the preferred embodiment, it may be secured in position on the platform by means of securing screws or threaded bolts 24 which extends through small size openings 26 of the base plate 22 and threaded into suitable openings of the base 12.

The base plate 22 advantageously includes an inner cylindrical recess 22a of a diameter just large enough to receive the inner end of inner cylinder or inner member 28. The inner cylinder 28 is opened at its outer end and includes an inner end wall 30 having an opening 32 therethrough for the passage of the threaded portion of the bolt 18. The bolt head 16 rests against the inner wall 30 and it is advantageously secured to the inner wall by means of welds 34. The apparatus will work substantially as well if the bolt 18 is not secured to the inner cylinder 28 as indicated for example in FIG. 2 without welds 34. The head of the bolt 16 will nevertheless be located within the inner cylinder 28 and for installation purposes it may be engaged by a screw driver (not shown) which engages a slot 16a thereof to thread the threaded part 20 into a receiving threaded bore defined on the article 10.

In order to prevent access to the head 16, the inner cylinder 28 is snugly enclosed by an outer cylinder 36 and extends snugly into groove 37 defined by a relatively thick, closed end of the outer cylinder in a mutually reinforcing relationship. The outer cylinder is received in an annular recess 22b defined on the base plate 22 on the exterior of the recess 22a so that the exterior end of the outer cylinder is closed by a projecting portion 22c at its periphery.

In accordance with a further feature of the invention the outer cylinder 36 carries a locking mechanism which, in the embodiment illustrated, comprises an annular key chamber 38 defined between an inner boss 40 and an outer ring 42. A key generally designated 44 for use in association with the lock includes a hollow cylindrical portion 46 having a key face at its outer end with strategically located recesses 48 of a number and location to accommodate uniquely designed lock elements 50 which project into the annular space 38 so that the hollow cylinder 46 will be received in the space. The key 44 is provided with an indexing point or indicator 52 which is positioned to align with a projection or tip 54 defined on the outer cylinder 46. When the key is thus positioned it may be readily inserted into the cylindrical space 38.

A locking mechanism includes a cylindrical member generally designated 56 which is rotated by the key 44. An eccentric cylinder 58 is formed on the intermediate cylindrical extension 60 of the cylindrical member 56 and it is located to project above an inner cylindrical face into the interior of the inner cylinder 28. A U-shaped member or latch 64 is engaged around the eccentric cylinder 58 and it includes two leg portions 64a and 64b which straddle an upward extension or pin 66 of the outer cylinder 36 so that the latch cannot rotate in respect to the outer cylinder. Rotation of the member 56 therefore causes the shifting of the eccentric cylinder 58 and the sliding lateral movement of the latch 64. The latch 64 may move to an outer position at which it engages into a groove 70 defined at the interior of the inner cylinder 28 adjacent its opened end. With the latch 64 thus positioned the inner cylinder cannot be disassociated from the outer cylinder 36. To unlock the two cylinders and permit access to the head 16 of the bolt 18 the key 44 is rotated to cause the eccentric cylinder 58 to be displaced sufficiently to cause the latch 64 to slide out of the groove 70 and to permit dissociation of the outer cylinder 36 from the inner cylinder 28. When this disassociation is effected the inner cylinder is opened at its outer end so that access to the head 16 of the bolt is possible to permit the unthreading thereof from the article 10 and the freezing of the article on the mounting base 12. A spring washer 72 is engaged around the eccentric cylinder portion 58 directly above the latch 64 and holds the latter in position thereon.

The invention provides a simple means for enclosing the head of a bolt so that no access to the head can be obtained for the purposes of turning it for threading or unthreading purposes. Since a bolt of a nature for use in holding a typewriter to a typewriter desk, for example, usually extends downwardly it is advantageous that the outer cylinder 36 be provided with a visual indicator such as the projection 54 to show the position in which the key may be inserted into the key receiving groove 38 without interference with the blocking elements 50. The lock may be made of only two interengageable parts if so desired (i.e. without the base plate 22) and they may be made of relatively small sizes only slightly larger than the head of the bolt which they are adapted to secure. The base plate which engages around the lower portion of the outer cylinder ensures that this cylinder will be covered and will prevent tampering with the locking device at all times. In addition, if the base plate is secured to the locking base for the article, it may be secured in position thereon by the use of the securing screws 24 or other interengageable elements.

In the embodiment indicated in FIG. 7, a lock assembly generally designated 10' including a base plate 22' similar to the embodiments of FIGS. 1 to 6 but which includes an outer cylinder or cover member, 36', having a tapered side wall in order to prevent rotation thereof by a tool such as a wrench. When more security is desired, a threaded member such as a bolt 18 is positioned so that its head is free to turn easily in respect to the inner cylinder 28.

In FIG. 8, an outer cylinder 36" is shown which includes a locating pin 54' and a stop pin 80. A key 44' which is partially indicated includes an indexing projection 52' which is inserted so that it becomes oriented alongside the indicating pin 54'. To unlock the device, the key is rotated in the direction of the arrow 82 until it abuts against the stop 80, at which time the lock will be opened.

A modification of the arrangement indicated in FIG. 8 is shown in respect to an outer cylinder 36''' in FIG. 9. In this embodiment, a half circular projecting collar 84 is provided which permits orientation of the key in an initial position for insertion and then permits rotation thereof to the final "open" position as determined by the respective ends 86 and 88.

In the embodiment of FIG. 10 there is shown a lock assembly generally designated 10'' which includes a combination inner cylinder and base plate 90 and an outer cylinder 92 having an outer wall which may be inserted into an annular recess 94 of the combination inner cylinder and base plate. In this embodiment a threaded member such as a bolt 96 is positioned to extend through an opening 97 of the combination inner cylinder and base plate 90. A feature of this construction is that the combination inner cylinder and base plate 90 includes a plurality of grooves, in this instance 3 grooves, 100, 102 and 104, any one of which may accommodate an eccentric latch portion 106 of a rotatable latching member 108 which is carried on the inner portion of the outer cylinder 92. This construction permits dimensional changes of the head 110 of the threaded member 96 which is to be held by the locking device.

In this embodiment illustrated the size of the head 110 is such that the latch 106 must be engaged in the intermediate groove 102. If the head 110 were of less depth than the outer cylinder 92 it may be directed further into the groove 94 to permit alignment of the latch 106 with the inner groove 104. On the other hand, if desired, the outer cylinder 92 may be retracted to align the latch 106 with the outer groove 100. In some instances, it is desirable to mount the latching member 108 so that it is biased in the direction toward the head 110 away from its rotatable mounting base 112. In such an instance, the inner cylinder may be mounted to the combination outer cylinder and base 90 and the spring will urge the latching member 108 to a location at which it will automatically engage with the closest groove to the head 110.

In FIG. 11 a lock 10''' includes a combination inner cylinder and base 90' having two openings 120 and 122 for the passage of chains 124 and anvil 126 therethrough. The chains are held together by a pin 128 which is locked within the inner cylinder and base 90'.

What is claimed is:

1. A device for enclosing and locking the head of a fastening member such as bolt, screw, rivet, chain or the like having a threaded shank, comprising an inner tubular member having an opened access end and a wall at its opposite end with at least one opening therethrough for the passage of the fastening member therethrough, the interior of said inner tubular member having latch engagement means, an outer tubular member having an opened end for receiving said inner tubular member and being engageable over a portion of the exterior of said inner tubular member and having an opposite closed end, said outer tubular member having portions which closely surround at least a portion of the interior and the exterior of said inner tubular member in a reinforcing manner, and key operated lock means accessible from the closed end and located on said outer tubular member adjacent the closed end including a latch movable by a key between a position engaged with said latch engagement means of said inner tubular member and a position disengaged from said latch engagement means of said inner tubular member to permit disassociation of said inner and outer tubular member.

2. A device, according to claim 1, including a base plate having a central opening for the passage of the threaded shank of the fastening member therethrough and arranged in an abutting relationship with said inner tubular member and said outer tubular member.

3. A device, according to claim 2, wherein said base plate includes an abutment face having an inner tubular recess of size to accommodate said inner tubular member and having an outer tubular recess surrounding said inner tubular recess for accommodating said outer tubular member.

4. A device, according to claim 1, wherein said latch engagement means on said inner tubular member comprises a recess defined in an inner wall of said inner tubular member, said latch comprising a member slidable on said outer tubular member and engageable in the recess of said inner tubular member.

5. A device, according to claim 3, including means associated with said base plate for securing said base plate to an article supporting base.

6. A device, according to claim 1, wherein said inner and outer tubular members are substantially cylindrical, said key operated lock means comprising a rotatable member, a key accommodating slot defined in the exterior of said outer tubular member engageable for receiving a key for rotating said rotatable member, said rotatable member carrying an eccentric cylindrical portion, said latch being carried on said eccentric cylindrical portion and held against rotational movement in respect to said outer tubular member and being shiftable by rotation of said rotatable member to shift said latch into engagement with said latch engagement means.

7. A device, according to claim 1, wherein said outer tubular member is tapered to prevent engagement of the surface thereof for rotational purposes.

8. A device for enclosing and locking the head of a fastening member such as bolt, screw, rivet, chain or the like having a threaded shank, comprising an inner tubular member having an open access end and a wall at its opposite end with at least one opening therethrough for the passage of the fastening member therethrough, the interior of said inner tubular member having latch engagement means, an outer tubular member having an opened end for receiving said inner tubular member and being engageable over a portion of the exterior of said inner tubular member and having an opposite closed end, key opterated lock means accessible from the closed end and located on said outer tubular member adjacent the closed end including a latch movable by a key between a position in which it is engaged with said latch engagement means of said inner tubular member and a position in which it is disengaged from said latch engagement means of said inner tubular member to permit disassociation of said inner and outer tubular member, said key operated lock means comprising an annular key slot, an annular key positionable in said annular slot, a latch member located adjacent the slot and being movable by the key to latch said outer tubular member to said inner tubular member, and key indicating means projecting outwardly from the surface of said outer tubular member adacent said key slot, said key having a projection adapted to be positioned alongside said key indicating means on said outer tubular member when the key is in a position to engage in said annular slot.

9. A device, according to claim 8, including a stop adjacent said annular slot for limiting rotatable movement of said key and defining a location at which said key is in an unlatching position.

10. A device, according to claim 9, wherein said indicating projection and said stop are defined by a semicircular collar projecting outwardly from said outer tubular member.

11. A device for enclosing and locking the head of a fastening member such as bolt, screw, rivet, chain or the like having a threaded shank, comprising an inner tubular member having an opened access end and a wall at its opposite end with at least one opening therethrough for the passage of the fastening member therethrough, the interior of said inner tubular member having latch engagement means, an outer tubular member having an opened end for receiving said inner tubular member and being engageable over a portion of the exterior of said inner tubular member and having an opposite closed end, and key operated lock means accessible from the closed end and located on said outer tubular member adjacent the closed end including a latch movable by a key between a position in which it is engaged with said latch engagement means of said inner tubular member and a position in which it is disengaged from said latch engagement means of said inner tubular member to permit disassociation of said inner and outer tubular member, said inner tubular member including a first flat end portion adapted to be pressed against a mounting base and an opposite end having an inwardly extending annular groove, said outer tubular member having an annular wall adapted to fit into said annular groove of said inner tubular member.

12. A device, according to claim 11, wherein said inner tubular member latch engagement means comprises a central bore into which said latch is adapted to be passed, said bore communicating with the opening for the fastening member at its inner end, a plurality of grooves defined, along the bore of said inner tubular member at axially spaced locations, said latch being orientable in a selected one of said grooves in accordance with the head of the fastening member engaged with said inner tubular member.

13. A device according to claim 12, wherein said outer tubular member is telescopic within the annular recess of said inner tubular member up to an extent at which the latching member is located adjacent the head of the fastening member contained in said inner tubular member central bore.

14. A device for enclosing and locking the head of a fastening member such as a bolt, screw, rivet, chain or the like, having a threaded shank, comprising an inner tubular member having an opened access end and a wall at the opposite end with at least one opening therethrough for the passage of the fastening member therethrough, the interior of said inner tubular member having latch engagement means, an outer tubular member having an opened end for receiving said inner tubular member and being engageable over a portion of the exterior of said inner tubular member and having an opposite closed end, and key operated lock means accessible from the closed end and located on said outer tubular member adjacent the closed end including a latch moveable by a key between a position in which it is engaged with said latch engagement means of said inner tubular member and a position in which it is disengaged from said latch engagement means of said inner tubular member to permit disassociation of said inner and outer tubular member, said inner tubular member includes at least two openings therethrough for the fastening member, the fastening member comprising a chain end passing through each opening and means for joining said two chain ends together in the interior of said inner tubular member.

15. A device for enclosing and locking the head of a threaded fastening member such as a bolt, screw, or the like, comprising a flat base member having an opening therethrough for the shank portion of the fastening member, an inner cylindrical member having an opened end and a closed end arranged in abutting relationship with said base member, said inner cylinder closed end having an opening therethrough for accommodating the shank portion of the threaded fastening member, an outer cylindrical member having an open end arranged in abutting relationship with said base member and surrounding said inner cylindrical member, said outer cylindrical member having portions which closely surround at least a portion of the interior and the exterior of said inner cylindrical member in a reinforcing manner, said outer cylindrical member having a closed end with a key access slot, a rotatable member on said outer cylindrical member engageable by a key in said key access slot, a latch mounted on said outer cylindrical member at a location adjacent said inner cylindrical member, said inner cylindrical member having a recess defined therein, said latch being displaceable by rotation of said rotatable member into engagement with the recess of said inner cylindrical member to lock said inner cylindrical member to said outer cylindrical member.

16. A device, according to claim 15, including an article mounting base, a threaded fastening member extending through the opening of said inner cylindrical member and said base plate and said article mounting base and into an article to be held on said mounting base, said threaded fastening member having a head portion engaged against the inner wall of said inner cylinder when said threaded member is tight in position.

17. A device, according to claim 16, including means for securing the head portion of said threaded fastening member to said inner cylinder.

18. A device for enclosing and locking the head of a threaded fastening member such as a bolt, screw, or the like, comprising a flat base member having an opening therethrough for the shank portion of the fastening member, an inner cylindrical member having an opened end and a closed end arranged in abutting relationship with said base member, said inner cylinder closed end having an opening therethrough for accommodating the shank portion of the threaded fastening member, an outer cylindrical member having an open end arranged in abutting relationship with said base member and surrounding said inner cylindrical member, said outer cylindrical member having a closed end with a key access slot, a rotatable member on said outer cylindrical member engageable by a key in said key access slot, a latch mounted on said outer cylindrical member at a location adjacent said inner cylindrical member, said inner cylindrical member having a recess defined therein, said latch being displaceable by rotation of said rotatable member into engagement with the recess of said inner cylindrical member to lock said inner cylindrical member to said outer cylindrical member, said key slot being annular and having a plurality of key selecting elements extending into the slot to block a portion thereof, the slot being accessible by a key having a plurality of recesses strategically located to accommodate the blocking elements, and a rotatable member in said outer cylindrical member comprising an eccentric cylindrical portion projecting inwardly from the interior of said outer cylindrical member, the recess in said inner cylindrical member comprising an annular recess adjacent its open end, said latch comprising a U-shaped latch member arranged around said eccentric cylinder and being held by a portion of said outer cylindrical member against rotation with said eccentric cylinder, said latch member being slidable into the recess of said inner cylindrical member to latch said inner and outer cylindrical members together.

References Cited

UNITED STATES PATENTS

| | | | |
|---|---|---|---|
| 1,689,437 | 10/1928 | Hurd | 70—49X |
| 1,810,195 | 6/1931 | Wharam | 70—231X |
| 1,853,162 | 4/1932 | Jacobi | 70—229X |
| 2,322,347 | 6/1943 | Churchman | 70—232 |
| 2,350,633 | 6/1944 | Obenauer | 70—232 |
| 3,260,081 | 7/1966 | Simon | 70—452X |
| 3,434,312 | 3/1969 | Buchman | 70—58 |
| 1,603,218 | 10/1926 | Smith | 70—232 |

FOREIGN PATENTS

| | | | |
|---|---|---|---|
| 412,884 | 2/1946 | Italy | 70—158 |

OTHER REFERENCES

"Popular Mechanics," December 1951, p. 133.

ALBERT G. CRAIG, JR., Primary Examiner

U.S. Cl. X.R.

70—168, 49